US011816683B2

(12) United States Patent
Morten et al.

(10) Patent No.: US 11,816,683 B2
(45) Date of Patent: *Nov. 14, 2023

(54) REFRESHING CONTENT ITEMS IN OFFLINE OR VIRALLY DISTRIBUTED CONTENT

(71) Applicant: GOOGLE LLC, Mountain View, CA (US)

(72) Inventors: Glenn A. Morten, Bellevue, WA (US); Brian Baker, Mercer Island, WA (US)

(73) Assignee: GOOGLE LLC, Mountain View, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 17/119,278

(22) Filed: Dec. 11, 2020

(65) Prior Publication Data

US 2021/0097555 A1 Apr. 1, 2021

Related U.S. Application Data

(63) Continuation of application No. 15/901,466, filed on Feb. 21, 2018, now Pat. No. 10,891,633, which is a
(Continued)

(51) Int. Cl.
*G06Q 30/02* (2023.01)
*G06Q 30/0251* (2023.01)

(52) U.S. Cl.
CPC ......... *G06Q 30/02* (2013.01); *G06Q 30/0255* (2013.01); *G06Q 30/0269* (2013.01)

(58) Field of Classification Search
CPC ..................... G06Q 30/0241; G06Q 30/02
See application file for complete search history.

(56) References Cited

U.S. PATENT DOCUMENTS 6,357,042 B2 3/2002 Srinivasan et al.
7,103,903 B1 9/2006 Kydd
(Continued)

OTHER PUBLICATIONS

Enhancing Internet Streaming Media with Cueing Protocols; Brassil et al., IEEE Infocom 2001.*
(Continued)

*Primary Examiner* — David J Stoltenberg
(74) *Attorney, Agent, or Firm* — Dority & Manning, P.A.

(57) ABSTRACT

A method, apparatus, and system are directed towards providing advertisement insertions at a point of consumption into digital content, such as broadcast television content. A content provider may initially mark the content for advertisement insertion, and create a metadata file indicating constraints, targets, expirations, or the like. A downstream user employs a plug-in component and provides an initial user profile, in part, to access the content with advertisements. As the content is played, and an advertising marker is encountered, fast forwarding or other skipping features are disabled, and an advertisement stream is spliced into the content stream. The advertisement stream is determined based on the user profile and/or other metadata. Moreover, the advertisement stream may be obtained over a network such that advertisements may be refreshed even years after the content has been acquired by the user. In one embodiment, the advertisement consumption may be tracked and reported.

20 Claims, 6 Drawing Sheets

Related U.S. Application Data continuation of application No. 12/036,982, filed on Feb. 25, 2008, now Pat. No. 9,911,126.

(60) Provisional application No. 60/911,047, filed on Apr. 10, 2007.

(56) References Cited

U.S. PATENT DOCUMENTS

| | | | |
|---|---|---|---|
| 7,610,597 B1 * | 10/2009 | Johnson | H04N 21/23424 725/32 |
| 7,975,310 B2 | 7/2011 | Hydrie et al. | |
| 2001/0034763 A1 | 10/2001 | Jacobs et al. | |
| 2002/0021665 A1 | 2/2002 | Bhagavath et al. | |
| 2003/0149618 A1 * | 8/2003 | Sender | G06Q 30/0277 705/26.1 |
| 2005/0289590 A1 * | 12/2005 | Cheok | G06F 3/0346 725/62 |
| 2006/0029093 A1 | 2/2006 | Van Rossum | |
| 2006/0029109 A1 * | 2/2006 | Moran | G06F 16/68 370/538 |
| 2006/0085816 A1 | 4/2006 | Funk et al. | |
| 2006/0193606 A1 | 8/2006 | Lamkin et al. | |
| 2006/0248209 A1 | 11/2006 | Chiu et al. | |
| 2006/0271425 A1 * | 11/2006 | Goodman | G06Q 30/02 705/14.69 |
| 2007/0088852 A1 | 4/2007 | Levkovitz | |
| 2007/0265073 A1 | 11/2007 | Novi et al. | |
| 2007/0288518 A1 | 12/2007 | Crigler et al. | |
| 2007/0294773 A1 * | 12/2007 | Hydrie | H04N 21/44204 348/E7.071 |
| 2008/0010117 A1 * | 1/2008 | Oliveira | H04N 21/458 705/26.1 |
| 2008/0097915 A1 | 4/2008 | Golan et al. | |
| 2008/0194332 A1 | 8/2008 | Kadikario et al. | |
| 2008/0229024 A1 | 9/2008 | Plamondon | |
| 2009/0204664 A1 | 8/2009 | Yovin et al. | |
| 2013/0006774 A1 | 1/2013 | Lazaridis et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |

OTHER PUBLICATIONS

Structuring Internet Media Streams With Cueing Protocols; Brassil et al., IEEE/ACM Transactions On Networking, vol. 10, No. 4, Aug. 2002.*
"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).
"'Dolphin' attacks fool Amazon, Google voice assistants", BBC News, Sep. 7, 2017 (8 pages).
"GoogleAssistant SDK", Google Developers, Google, retrieved Aug. 22, 2017 from URL: https://developers.google.com/assistant/sdk/ (4 pages).
"Products Feed Specification", Google Merchant Center Help, Google, Inc., retrieved Mar. 18, 2013 from URL: http://www.support.google.com/merchants/bin/answer.py?hl=en&answer=188494#US (6 pages).
"Supported File Formats", Google Merchant Center Help, Google, Inc., retrieved Mar. 18, 2013 from URL: http://www.support.google.com/merchants/bin/answer.py?hl=en&answer=160567 (1 page).
"Walmart and Google to offer voice-enabled shopping", BBC News, Aug. 23, 2017 (10 pages).
Abrams, Brad, "Help users find, interact & re-engage with your app on the Google Assistant", Google Developers Blog, Nov. 15, 2017 (16 pages).
Albrecht, Chris, "Alexa, How Can You Be Used in Restaurants?", The Spoon, Dec. 10, 2017 (6 pages).

Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).
Barr, Jeff, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018 (6 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, Cohen, "Apple patent filing reveals potential whispering Siri functionality", Techspot, Dec. 14, 2017 (4 pages).
Collins, et al., "Can Twitter Save Itself?", CNET, Apr. 26, 2017, retrieved Aug. 22, 2017 from URL: https://www.cnet.com/news/twitter-q1-2017-earnings/ (3 pages).
Crist, Ry, "Logitech Harmony's Alexa skill just got a whole lot better", CNET, Jul. 13, 2017 (2 pages).
Estes, Adam Clark, "Amazon's Newest Gadget Is a Tablet That's Also an Echo", Gizmodo, Sep. 19, 2017 (3 pages).
Final Office Action for U.S. Appl. No. 12/036,982 dated Jan. 26, 2017 (11 pages).
Final Office Action for U.S. Appl. No. 12/036,982 dated Jun. 15, 2011 (10 pages).
Final Office Action for U.S. Appl. No. 12/036,982 dated Oct. 16, 2014 (19 pages).
Forrest, Conner, "Essential Home wants to be bridge between Amazon's Alexa, Apple's Siri, and GoogleAssistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", CNET, May 20, 2017, retrieved Aug. 22, 2017 from URL: https://www.cnet.com/news/google-assistant-is-spreading-but-google-still-needs-a-dot/ (7 pages).
Gebhart, Andrew, "Google Home to the Amazon Echo: 'Anything you can do . . . '", CNET, May 18, 2017 (7 pages).
Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).
Golgowski, Nina, "This Burger King Ad Is Trying to Control Your Google Home Device", HuffPost, Apr. 12, 2017 (7 pages).
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
International Search Report and Written Opinion for PCT Appl. Ser. No. PCT/US2008/059724 dated Aug. 8, 2008, 6 pages.
Johnston, Lisa, "Amazon Whirlwind: New Echo, Plus, Spot, Connect, Fire TV Take The Stage", Twice, Sep. 27, 2017 (10 pages).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, And Progressive Among Brands Testing", Forbes, May 11, 2017 (2 pages).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).

(56) References Cited

OTHER PUBLICATIONS

Lee, Dave, Take Two for Samsung's troubled Bixby assistant, BBC News, Oct. 19, 2017 (6 pages).
Lee, Dave, "The five big announcements from Google I/O", BBC News, May 18, 2017 (9 pages).
Lund, Pamela, "Mastering Google Product Feeds and Product Listing Ads—Part 1", retrieved Dec. 28, 2013 from URL: http://www.blueglass.com/blog/mastering-google-product-feeds-and-product-listing-ads-part-1/#comments (17 pages).
Nieva, Richard, "Google Home and eBay can tell you how much that's worth", CNET, Mar. 8, 2017 (3 pages).
Non-Final Office Action for U.S. Appl. No. 12/036,982 dated Jun. 6, 2014 (15 pages).
Non-Final Office Action for U.S. Appl. No. 12/036,982 dated Nov. 19, 2015 (22 pages).
Non-Final Office Action for U.S. Appl. No. 12/036,982 dated Oct. 14, 2010 (10 pages).
Non-Final Office Action for U.S. Appl. No. 15/901,466 dated May 29, 2020 (12 pages).
Notice of Allowance for U.S. Appl. No. 12/036,982 dated Oct. 23, 2017 (10 pages).
Notice of Allowance for U.S. Appl. No. 15/901,466 dated Oct. 1, 2020 (10 pages).
Novet, et al., "Amazon is getting ready to bring Alexa to work", CNBC, Nov. 29, 2017 (4 pages).
Palladino, Valentina, "Garmin teamed up with Amazon to make a tiny Echo Dot for your car", ars TECHNICA, Oct. 17, 2017 (2 pages).
Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).
Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load Up Apps' Legal Challenges At 'Silicon Beach'", Law360, Los Angeles, California, Feb. 2, 2017 (4 pages).
Swedlow, "Digital Set-top Box Deployments", Interactive TV Today, The American Film Institute, Intel Corporation, http://www.iM.com/etvwhitepaper-6.html, accessed Nov. 1, 2007, 10 pages.
Willens, Max, "For publishers, Amazon Alexa holds promise but not much money (yet)", Digiday, Jul. 6, 2017 (6 pages).

\* cited by examiner

REFRESHING CONTENT ITEMS IN OFFLINE OR VIRALLY DISTRIBUTED CONTENT

CROSS-REFERENCE TO RELATED APPLICATIONS

This application claims the benefit of priority under 35 U.S.C. § 120 as a continuation of U.S. patent application Ser. No. 15/901,466, filed Feb. 21, 2018, which claims the benefit of priority under 35 U.S.C. § 120 as a continuation of U.S. patent application Ser. No. 12/036,982, filed Feb. 25, 2008 and issued as U.S. Pat. No. 9,911,126 on Mar. 6, 2018, which claims the benefit of priority under 35 U.S.C. § 119 to U.S. Provisional Pat. App. 60/911,047, filed Apr. 10, 2007, each of which is hereby incorporated herein by reference.

BACKGROUND

The present invention relates generally to digital advertisement distributions, and more particularly but not exclusively to enabling advertisements to be inserted at a point of consumption to refresh advertisements in offline content and/or virally distributed content in a manner such that the consumer is inhibited from skipping past the advertisements.

Today, content owners, and/or providers are seeking new revenue opportunities with Internet distribution of the content. However, consumers of such content often prefer to receive 'free' content. This situation tends to make advertisement placement a tremendous opportunity for content owner revenue. Unfortunately, many content owners are facing a number of technical hurdles that inhibit their ability to realize a scale similar to that of revenue in the video distribution as has been experienced in the broadcast television arena. Such hurdles include but are certainly not limited to how does one determine that an advertisement is watched by the consumer, either online in real-time, or offline? How may one ensure that an advertisement is not removed from the video, or skipped, such that the consumer avoids viewing of the advertisement? During peer-to-peer redistribution of a video how may one ensure that the advertisement is also distributed and/or later consumed? When an advertisement is distributed, such as virally (peer-to-peer distributions), how may one ensure that the advertisement is consumed downstream? Moreover, as such digital content may survive in the network or even within a client device for an indefinite period of time, how may one avoid stale advertising content, and still glean incremental advertisement revenue from the viewing of older content? In addition, content owners and advertisers may wish to provide advertisements based on a specific consumer, consumer type, and/or geographic region. Thus, it is with respect to these considerations and others that the present invention has been made

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
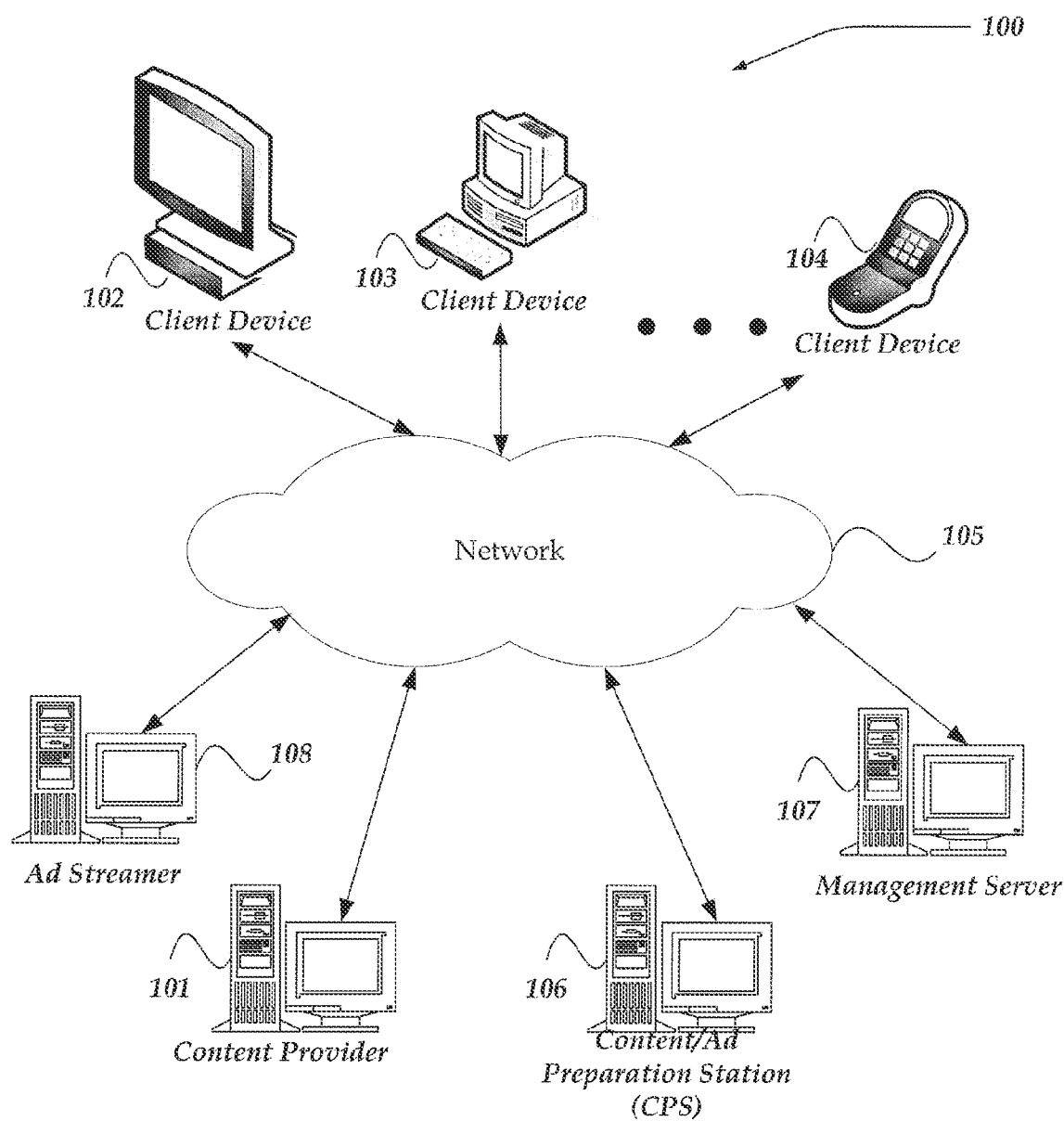
FIG. 1 shows a functional block diagram illustrating an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "content" as used herein refers to virtually any content that includes at least an audio component and a video component. Thus, multimedia content includes, but is not limited to motion pictures, movies, videos, music videos, Pay-For-View (PPV) content, Video On Demand (VoD), interactive media, audio files, still images, text, graphics, scripts, applications, and other forms of digital content useable by a computing device. However, content is not limited to these examples, and virtually any content may be included, without departing from the scope of the invention. Multimedia content further includes the content files themselves, independent of their format. However, in one embodiment, the content is provided as a Moving Pictures Experts Group (MPEG) content stream, such as a transport stream, or the like. However, the invention is not so limited, and other file formats may also be employed, without departing from the scope or spirit of the invention. For example, the invention may be configured to employ, without limitation, at least Flash video files (.FLV), Shockwave Flash (.SWF) files, H.263, H.264, Windows Media, Quick Time (QT), Real, or virtually any other file format, streaming format, or the like.

MPEG is an encoding and compression standard for digital broadcast content. MPEG provides compression support for television quality transmission of video broadcast content. Moreover, MPEG provides for compressed audio, control, and even user broadcast content. One embodiment of MPEG-2 standards is described in ISO/IEC 13818-7 (available at http://www.iso.org), which is hereby incorporated by reference.

MPEG content streams may include Packetized Elementary Streams (PES), which typically include fixed (or variable sized) blocks or frames of an integral number of elementary streams (ES) access units. An ES typically is a basic component of an MPEG content stream, and includes digital control data, digital audio, digital video, and other digital content (synchronous or asynchronous). A group of tightly coupled PES packets referenced to substantially the same time base comprises an MPEG program stream (PS). Each PES packet also may be broken into fixed-sized transport packet known as MPEG Transport Streams (TS) that form a general-purpose approach of combining one or more content streams, possible including independent time bases. Moreover, MPEG frames may include intra-frames (I-frames), forward predicted frames (P-frames), and/or bi-directional predicted frames (B-frames).

Briefly, the present invention is directed towards a method, apparatus, and system for providing advertisement insertions at a point of consumption into digital content, such as broadcast television content, or the like, in a manner that inhibits skipping viewing of the advertisement. A content provider may initially mark the content for advertisement insertion, and create a metadata file indicating constraints, targets, expirations, or the like. A downstream user may employ a plug-in component and may provide an initial user profile, in part, to access the content with advertisements. In one embodiment, the initial user profile may include information about a geographic region of the user, user viewing preferences, settings, network history, including such as web browsing history, as well as a variety of other information useable to select advertisements that may be directed towards the user.

As the content is played, and an advertising marker is encountered, fast forwarding and/or other view skipping mechanisms are disabled, and an advertisement stream is spliced into the content stream. The advertisement stream is determined based on the user profile and/or other metadata. Moreover, in one embodiment, the advertisement stream may be obtained over a network such that advertisements may be refreshed virtually anytime after the content has been acquired by the user. In another embodiment, the advertisement may be stored locally to the user, perhaps on a local client device, or the like. In one embodiment, the advertisement consumption may be tracked and reported. In one embodiment, the viewing statistics may be used to determine advertising revenues, or even coupons, awards, or the like, payable to the content provider, and/or the viewing user. Once the advertisement has been played, fast forwarding and other skipping mechanisms are re-enabled. In one embodiment, if content is rewound such that the advertising marker is again re-encountered, skipping and the like, is again disabled, and either the same or a new advertisement stream is spliced into the content stream for playing.

By employing the present invention, unique advertisement revenue may be realized with online and offline viewing, as well as initial and subsequent viewings. For example, in one embodiment, new advertisements may be inserted into content, such as television (TV) programs, or the like, that may be stored on a client device during playout. Such mechanism for accomplishing this results in advertising refresh. Moreover, use of the present invention may provide advertisement integrity and ensure advertisement consumption whether the content is viewed online, or offline. Such advertisements may be provided based on a targeted user using preference data obtained from the consumer, geographical data, or the like. In one embodiment, "hot advertisements" can be given a different priority for insertion into content during playout of the content by the user, where the term "hot advertisements" refers to one or more advertisements which may have a higher priority of playout than another advertisement. Thus, hot advertisements, for example, may be those advertisements that may have time sensitive information, such as sales information. However, hot advertisements may also have other criteria in addition to or other than time that determines them to receive a higher priority than another advertisement.

Illustrative Environment

FIG. 1 shows a functional block diagram illustrating one embodiment of operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes client devices 102-104, content provider 101, Content/Ad Preparation Station (CPS) 106, Management server 107, and Ad Streamer 108, each of which may communicate with each other through network 105.

One embodiment, of client devices 102-104 is described in more detail below in conjunction with FIG. 2. Briefly, however, client devices 102-104 include virtually any network device capable of receiving and/or receiving content over a network, such as network 105, from another computing device. Client devices 102-104 may also include any computing device capable of receiving content employing a variety of mechanisms, including, but not limited to a network, CDs, DVDs, tape, electronic memory devices, or the like. The set of such devices may include devices that typically connect using a wired communications medium such as personal computers, multiprocessor systems, microprocessor-based or programmable consumer electronics, network PCs, or the like. The set of such devices may also include devices that typically connect using a wireless communications medium such as radio frequency (RF) devices, infrared (IR) devices, Bluetooth devices, integrated devices combining one or more of the preceding devices, or the like. Client devices 102-104 may also be any device that is capable of connecting using a wired or wireless communication medium such as a laptop and any other device that is equipped to communicate over a wired and/or wireless communication medium to receive and play content. Similarly, Client devices 102-104 may employ any of a variety of player components to enjoy such content, including, but not limited to, a computer display system, an audio system, a jukebox, set top box (STB), a television, video display device, software player components, or the like.

Client devices 102-104 may receive content as scrambled/encrypted and employ a conditional access control component to decrypt content, and/or enable access to an entitlement and/or right associated with content. For example, client device may receive content decryption keys, access keys, entitlements and/or rights, or the like. Moreover, client device may employ a smart card, such as a virtual smart card, or the like, to manage access to and decryption of the content.

Client devices 102-104 may receive content over network 105. However, client devices 102-104 are not limited to receiving content over network 105. For example, content may be provided to client devices 102-104 using any of a variety of other portable content storage devices, including, but not limited to Digital Versatile Discs (DVDs), High Definition DVD (HD-DVD), Compact Discs (CDs), Video Compact Disc (VCD), Super VCD (SVCD), Super Audio CD (SACD), Dynamic Digital Sound (DDS) content media, Read/Write DVD, CD-Recordable (CD-R), Blu-Ray discs, or the like. Moreover, client devices may receive content using, for example, a portable content storage device, while receiving plug-ins or other information, content, and data, over network 105, without departing from the scope or spirit of the invention.

Client devices 102-104 are further configured to request and a plug-in to enable playing of the content. Such plug-in may be obtainable, for example, from a variety of sources, including, but not limited to a portable storage device, and/or network 105. One embodiment of such a plug-in is described in more detail below in conjunction with FIG. 2.

In one embodiment, the received content may include a marker, or other identifier useable to indicate where an advertisement may be inserted. In one embodiment, the advertisement may already be inserted within the content at, at least the identified position within the content. In any event, even if an advertisement is inserted within the content, the marker may be configured such that during play of the content, when the marker is encountered, another advertisement might be used to replace the current advertisement. When the marker is encountered, a plug-in may be configured and arranged to direct the content player or other client component to disable features that enable a consumer to skip, fast-forward, or otherwise avoid viewing of the advertisement at a normal viewing speed. When the plug-in determines that the advertisement has been played, the plug-in may then redirect the content player or other client component to enable the disabled forwarding features. In one embodiment, viewing statistics may also be provided to a network work device, such as content provider 101, management service 107, or the like.

Communications between various components within operating environment 100 may be performed over a network 105. Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between one networked computing device and another.

Moreover, network 105 may represent a plurality of different components, and/or network paths between networked devices. Thus, content and/or other information provided between computing devices may employ at least in part a different network component and/or path. For example, content provider 101, Ad streamer 108, or the like, may provide content and/or advertisements to client devices 102-104 over a satellite link, a wired link, a telephone dial-up component, or the like.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

Content provider 101 includes virtually any computing device configured to provide content from producers, developers, and owners of content. Content provider 101 may also be configured to provide a content plug-in useable to manage viewing of advertisements with the content. In one embodiment, content provider 101, or even another computing device, may provide a download manager that is configured to manage the download of a content plug-in, and/or setup storage for content and/or advertising.

In one embodiment content provider 101 may also be configured to receive a request for registration of a user of one of client devices 102-104 to receive content with advertisements. In one embodiment, during the registration, and/or at various times after registration, the user may provide various profile information, including, but not limited to information indicating a geographic region of the user, user viewing preferences, settings, network history, including such as web browsing history, as well as a variety of other information useable to select advertisements that may be directed towards the user.

Devices that may operate as content provider 101 include personal computers, desktop computers, multiprocessor systems, network PCs, servers, or the like. Moreover, although content provider 101 is illustrated as a single computing device, the invention is not so limited. For example, content provider 101 may be implemented as a plurality of computing devices.

In one embodiment, content provider 101 may provide the content and/or advertisements to CPS 106 for use in enabling marking of advertisement insertion points into content. CPS 106 may be further configured to encrypt content for disablement of program viewing without content plug-in, creation of metadata for targeting advertisements, and/or digital hashing for verification and integrity protection for advertisements, and/or content.

CPS 106 may prepare the content, in one embodiment, by placing various markers in the content where an advertisement is to be inserted. In one embodiment, such locations may be identified using a variety of identification mechanisms by the content provider 101. Thus, content provider 101 might indicate, for example, that an advertisement is to be inserted at a particular location, and CPS 106 might insert a marker to identify where and/or how to obtain the advertisement to be inserted. CPS 106 may employ a variety of mechanisms to inserting a marker to identify the insertion of an advertisement, including, but not limited to using Advanced Television Enhancement Forum (ATVEF) triggers, Wink™ triggers, Worldgate™ triggers, or the like. In one embodiment, CPS 106 may employ a URL to indicate where an advertisement is inserted. In one embodiment, CPS 106 might further provide markers, triggers, or the like, that may be readable by a client component, such as a plug-in, or the like, to indicate additional actions to perform. Such additional actions may include, providing metadata to a network device that may be useable to identify which advertisement to insert. The additional actions might also instruct the plug-in to have disabled various features of the client device, and/or player components that might enable a user of the client device to skip past, fast forward, or otherwise attempt to not play the advertisement in its entirety at what is considered a normal speed. The markers, triggers, or the like, may also be inserted at an end of an advertisement to indicate to the client device, plug-in, or the like, to re-enable the disabled features, and/or to provide viewer statistics to a networking device.

Ad streamer 108 is configured to enable network based advertisement insertions into a content stream dynamically. In one embodiment, ad streamer 104 may receive a request for content and in response, provide the content to the requesting device, such as client devices 102-104, or the like. In one embodiment, ad streamer 108 may also provide one or more advertisements that are to be played at identified locations before, during, or even at an end of the content. Devices that may operate as ad streamer 108 include personal computers, desktop computers, multiprocessor systems, network PCs, servers, or the like.

Management server 107 includes one or more computing devices arranged to enable distribution of advertisement targeting metadata, and/or the collection of viewing statistics and reporting information obtainable from client devices 102-104. Devices that may operate as management server 107 include personal computers, desktop computers, multiprocessor systems, network PCs, servers, or the like.

It should be noted that while FIG. 1 illustrates ad streamer 108, content provider 101, CPS 106, and management server 107 as distinct network devices, the invention is not so limited. For example, one of more functions of such network devices may be distributed across a plurality of network devices. Moreover, in one embodiment, one or more functions of such network devices may be incorporated within the same network device as one or more other functions of such network devices, without departing from the scope of the invention.

Illustrative Client Device

Figure 2:
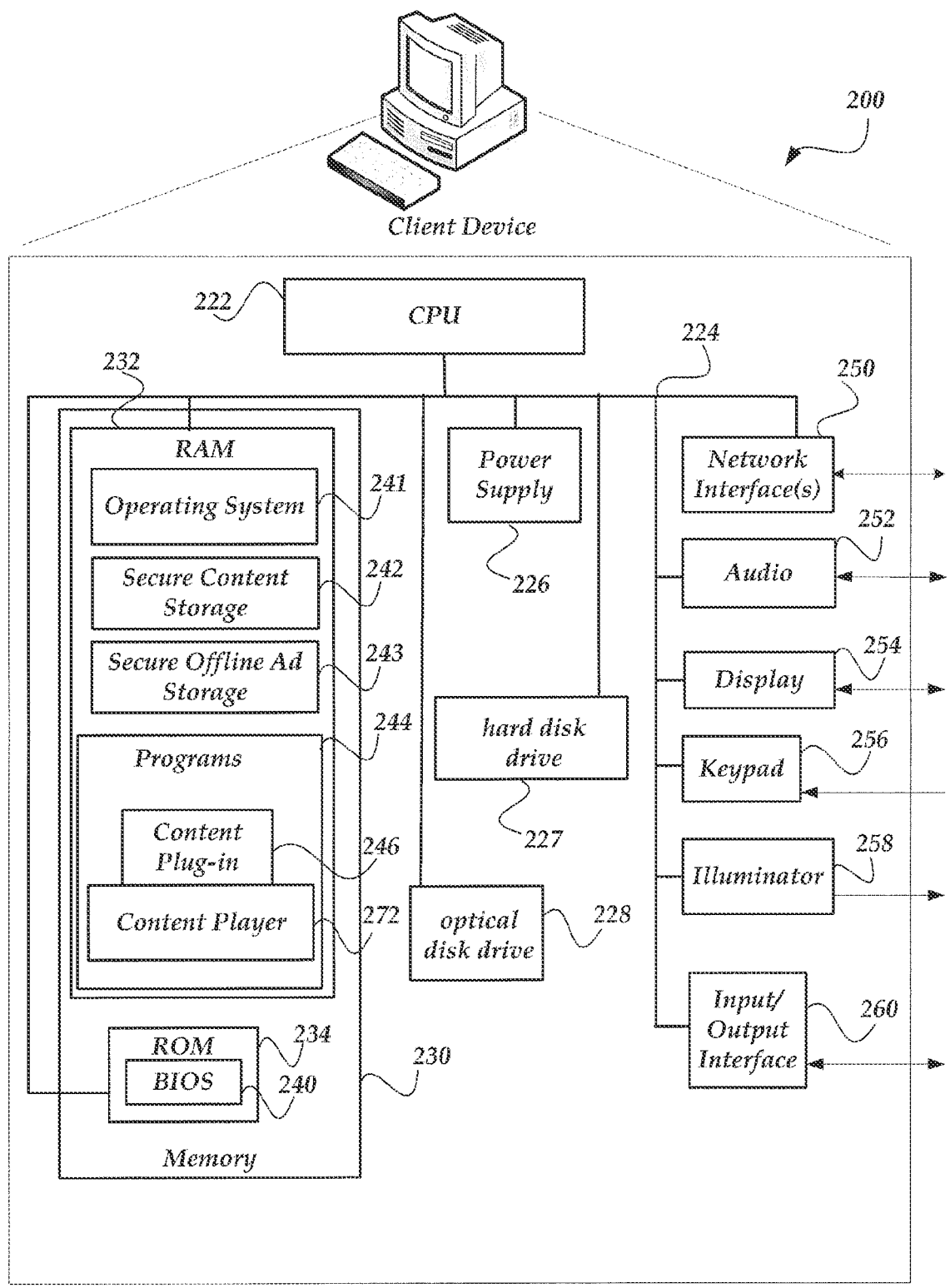
FIG. 2 illustrates one embodiment of a client device useable for viewing offline or virally distributed content with advertisements.

FIG. 2 shows one embodiment of client device 200 that may be included in a system implementing the invention. Client device 200 may represent one embodiment of client devices 102-103 of FIG. 1.

Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an optional audio interface 252, a display 254, a keypad 256, an illuminator 258, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 252 is arranged to produce and receive audio signals such as the sound of a human voice, music, or the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Client device 200 may further include additional mass storage facilities such as optical disk drive 228 and hard disk drive 227. Hard disk drive 227 is utilized by client device 200 to store, among other things, application programs, databases, and the like. Additionally, optical disk drive 228 and hard disk drive 227, a flash memory, or the like may store content, advertisements, metadata, user profiles, user network activity history, or the like.

Keypad 256 may comprise any input device arranged to receive input from a user (e.g. a sender). For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, mouse, stylus, or other input or output devices. Input/output interface 260 can utilize one or more communication technologies, such as USB, infrared, Bluetooth™, and the like. Optional haptic interface 262 is arranged to provide tactile feedback to a user (e.g. a sender) of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include an interface with a Java virtual machine module that enables control of hardware components and/or operating system operations via Java application programs.

Memory 230 further includes one or more data storage mediums, which can be utilized by client device 200 to store, among other things, programs 244 and/or other data. For example, at least one data storage may also be employed to store information that describes various capabilities of client device 200. The information may then be provided to another device based on any of a variety of events, including being sent as part of a header during a communication, sent upon request, and the like. Moreover, at least one data storage medium may be used to store information about a user's viewing history, user preferences, client device settings, user's network activity history, information indicating a geographic region where the client device might be located, or the like. In one embodiment, at least some of this information may be stored as metadata useable to determine an advertisement to insert within content for the user to view. In one embodiment, the data storage may further store information about the user's viewing statistics, including, when the user viewed the content and/or an advertisement, how often the content/advertisement is viewed, including whether the user re-wound and/or viewed the content/advertisement more than once.

Memory 230, or another component of client device 200, may further include other data storages, including, but not limited to secure content storage 242, and/or secure offline ad storage 243. Secure content storage 242 may be configured and arranged to securely store content that is streamed or otherwise provided to client device 200 for viewing. Secure offline ad storage 243 may be configured and arranged to securely store advertisements for offline viewing. That is, when client device 200 is configured and arranged to view content absent of an active network connection, the content, and/or advertisement to be viewed is available local to the client device through secure offline storage 243, or where client device has an active network connection, but a marker or other identifier indicates that the advertisement is locally stored.

Although secure content storage 242 and secure offline storage 243 are illustrated within memory 230, the invention is not so constrained, and such storage may also reside within other storage mediums, including, but not limited to optical disk drive 228, hard disk drive 227, or the like.

Programs 244 may also include computer executable instructions which, when executed by client device 200, transmit, receive, and/or otherwise process messages and enable telecommunication with another user of another client device. Other examples of application programs include calendars, contact managers, task managers, transcoders, database programs, word processing programs, security programs, spreadsheet programs, games, CODEC programs, virtual smart cards, and so forth. In addition, mass memory 230 may include content plug-in 246 and content player 272.

Content player 272 may include virtually any mechanism configured and arranged to receive content and/or advertisements and to enable the content/advertisements to be viewed by a user of client device 200. Content player 272 may include a variety of sub-components configured to receive content and/or advertisements through a network and/or local storage. Content player 272 may employ, in one embodiment, a virtual smart card, or other security mechanism to determine whether the client device is enabled to decrypt encrypted content and/or otherwise enable viewing of content. One embodiment of content player 272 is described in more detail in U.S. Pat. No. 7,007,170, entitled "System, method, and apparatus for securely providing content viewable on a secure device," to Glenn Morten, which is hereby incorporated by reference. However, the invention is not limited to use of such content player, and other implementations may also be employed.

In any event, content player 272 may communicate requests for content and/or advertisements through content plug-in 246. In one embodiment, plug-in 246 may be configured to manage download of content, content storage setup, advertising storage setup, and management of content/advertisements. Content plug-in 246 may also be configured to manage client based advertisement insertion, disablement of advertisement skipping, tracking of advertisement consumption whether online, offline, or downstream in a peer-to-peer recipient configuration. In one embodiment, content plug-in 246 may send a instruction, script, or the like, to content player or other component of client device 200 that requests that various features be disabled that allow a user to skip past, fast-forward, or otherwise avoid viewing of an inserted advertisement in its entirety in other than what is considered to be a normal viewing speed. Content plug-in 246 may, once it is determined that the advertisement has played in its entirety, request that such disabled features be enabled. In one embodiment, content plug-in 246 may allow a user to stop viewing of the content/advertisement, while an advertisement is being viewed, but, unable to view a section of the content after the inserted advertisement without having played the inserted advertisement.

Content plug-in 246 may also be arranged to manage consumer profiling for targeting and geo-filtering, verification and protection of advertisement integrity, advertisement refreshment capability, advertisement targeting based on user data and/or geography, or the like. In addition, content plug-in 246 may further manage integrity and/or privacy of viewing statistics. In one embodiment, content plug-in 246 may be configured to provide the viewing statistics to another device, such as content provider 101, content management server 107, or the like, as illustrated in FIG. 1.

Generalized Operation

The operation of certain aspects of the invention will now be described with respect to FIGS. 3-6. Briefly, FIGS. 3-6 illustrate signal flow diagrams generally showing various embodiments of processes for initial viewing of content and refreshable advertisements for online, offline configurations, as well as repeat viewing of such content and refreshable advertisements. Refreshable advertisements refers to advertisements that may be replaced by one or more other advertisements for playing at a location associated with the content based on a variety of criteria.

Figure 3:
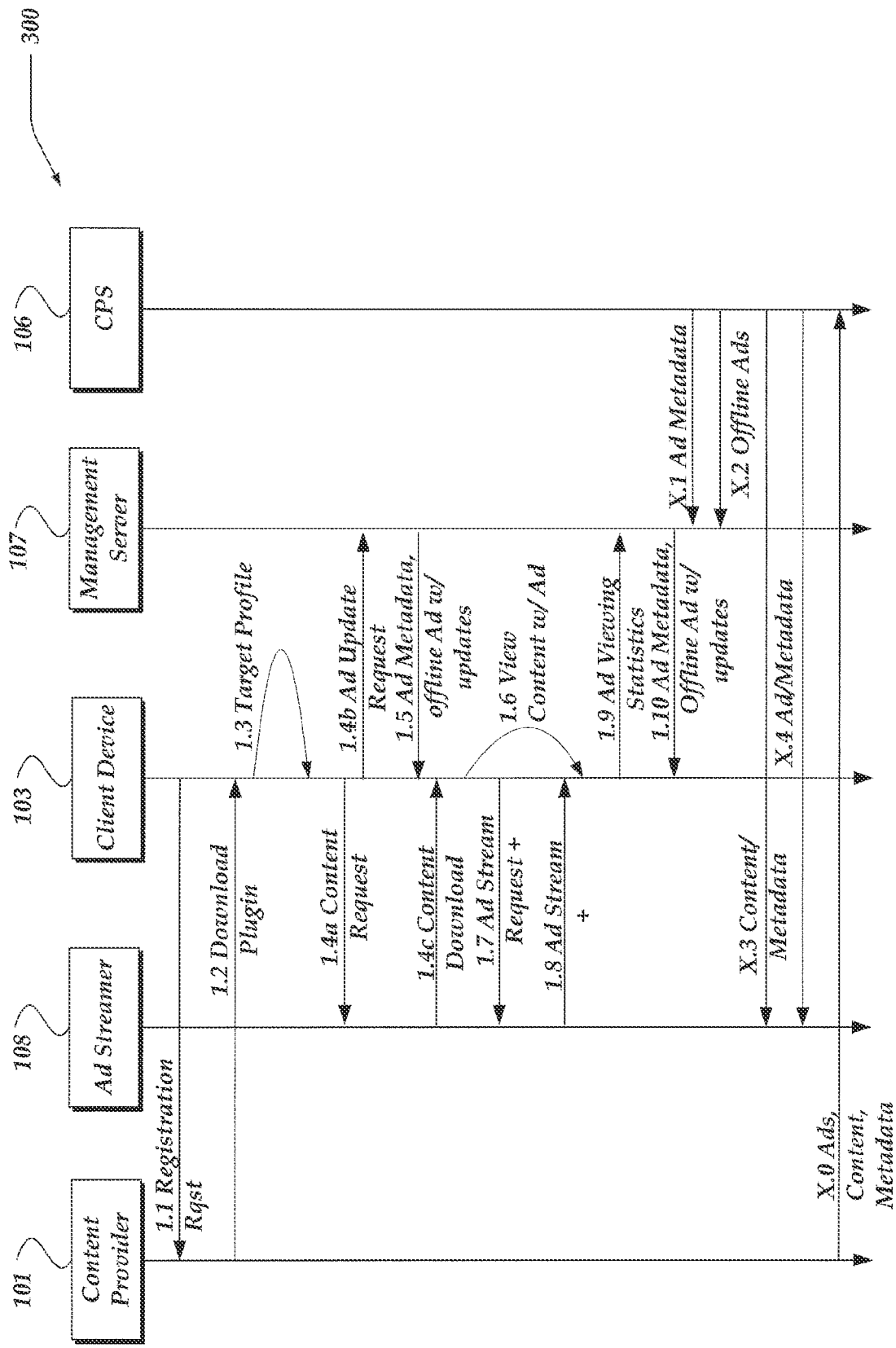
FIG. 3 shows a signal flow diagram generally showing one embodiment of a process for viewing content and refreshable advertisements in an online configuration for the client device.

FIG. 3 show a signal flow diagram generally showing one embodiment of a process for viewing content and refreshable advertisements in an online configuration for the client device. As shown in diagram 300, content provider 101, ad streamer 108, a representative client device 103, management server 107, and CPS 106 of FIG. 1 provide steps that include, but are not limited to communicating messages, content, advertisements, metadata, and other information between each other (or among a single device) to enable viewing of content and refreshable advertisements.

As may be seen in FIG. 3, the flow of steps over time is generally downward in the illustration. However, those steps that are identified with the prefix x.#, where # is an integer value $_{1-4}$, may occur at virtually any time, independent of the other step flows.

Thus, at virtually any time in diagram 300's flow, new content and/or advertisements may be made available. As shown, CPS 106 may mark content for advertising insertion. In one embodiment, the content and/or advertisements may be provided by content provider 101 (step x.0), however, the invention is not limited to receiving the content and/or advertisements, and/or metadata information from content provider 101, and other sources may also provide the content, advertisements, and/or metadata. In one embodiment, CPS 106 may also create metadata that may include but is not limited to various information, such as geo-filtering constraints, targeting data, content identifiers, optional expiration information, or the like.

CPS 106 may then, in one embodiment, encrypt the content to enforce use of content plug-in 246 of FIG. 2. In one embodiment, such actions may further enable legal recourse for failure to adhere to a contractual agreement by the user, or other entity in the system.

CPS 106 may also create advertising metadata that may include, but is not limited to various information, such as geo-filtering constraints; temporal constraints such as, for example, do not play before or after a defined event, time, or the like; targeting data, priority information, or the like. CPS 106 may then provide the content, advertising, and/or metadata to other devices within diagram 300 through steps x.1, x.2, x.3, and/or x.4.

As further illustrated in FIG. 3, a consumer using representative client device 103, may browse or otherwise identify content for viewing. In one embodiment, such browsing may be performed through a network site provided through content provider 101, or the like. The user, through representative client device 103 may then register for receiving content. See step 1.1. The user may then be provided with a download of content plug-in 246 for installation (step 1.2). It should be noted, that where the user already has installed the content plug-in 246, an update may be provided during step 1.2, in one embodiment, if available. Otherwise, step 1.2 might be ignored.

Content plug-in 246 may create an initial user profile considering a variety of factors, including, but not limited to geographic region of client device 103, preferences, settings, network browsing history, and the like. At steps 1.4*a-c* and 1.5, content may then be requested, advertisement updates requested and content, advertisements, and metadata are provided to the client device 103.

Continuing in diagram 300, if client device 103 meets the geo-filtering constraints, and/or any other constraints imposed, including that the content is still valid, viewing may begin at step 1.6. Content may be valid (or invalid) for viewing based on a variety of factors, including, but not limited to the content being identified as time constrained, such that the content can be played a limited number of times, not before a certain time, not after a certain time, or the like. Content may also be valid (or invalid) for viewing where the content is improperly obtained, such as improper duplications, or the like. Content may further be valid (or invalid) for viewing if the client device does not possess proper decryption keys, or the like.

In one embodiment, decryption of the content may be performed in real-time. As advertising markers are encountered, fast-forwarding and/or other skipping features are automatically disabled and an advertisement stream is spliced into the stream and provided to client device 103 in steps 107-108. As described above, the choice of the inserted advertisement may be based on targeting heuristics from the consumer's profile and other advertisement metadata, or the like. It should be noted that while a first advertisement might be selected for viewing during a particular location identified by an advertising marker, a replay of the content, or a subsequent playing of the content at some later time could result in a second advertisement being selected for viewing during the same particular location identified by the advertising marker. Thus, in one embodiment, a user might be exposed to different advertisements, or the same advertisements, by playing the same content repetitively.

Moreover, as indicated in the figure, multiple advertisements may be requested and inserted into the content for viewing. When an inserted advertisement completes playing, content playback continues and the client device 103 is again enabled to allow skipping, fast-forward, and other similar features to be used. In one embodiment, after each advertisement is viewed, statistics may be forwarded to another device through step 1.9 for use in updating advertisement(s)/metadata to be retrieved. In another embodiment, the viewing statistics may be stored locally, and provided to another network device, upon termination of playing the associated content.

Figure 4:
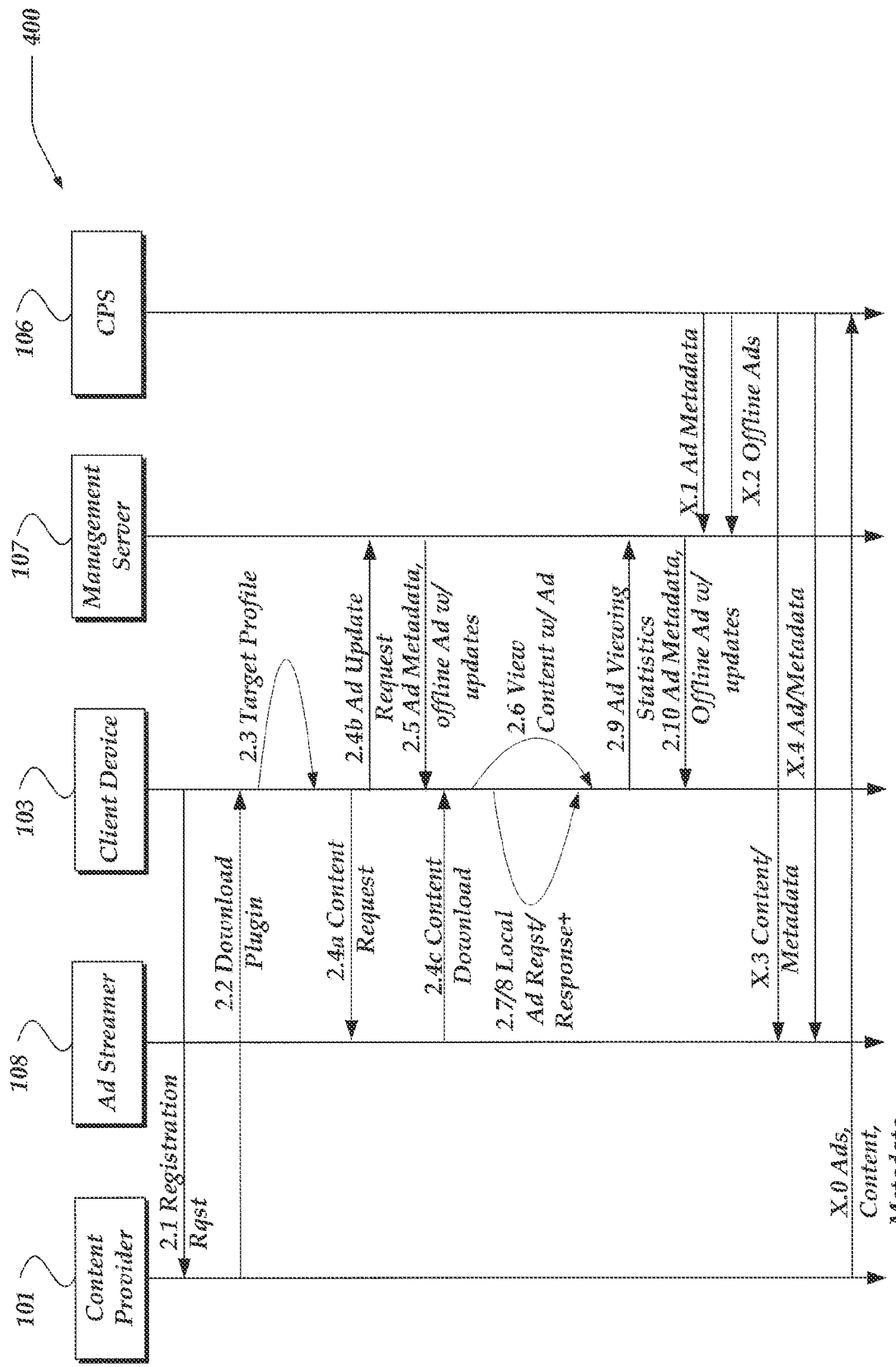
FIG. 4 shows a signal flow diagram generally showing one embodiment of a process for viewing content and refreshable advertisements in an offline configuration for the client device.

FIG. 4 show a signal flow diagram generally showing one embodiment of a process for viewing content and refreshable advertisements in an offline configuration for the client device. Diagram 400 of FIG. 4 is substantially similar to diagram 300; however, in an offline configuration, viewing of advertisements may be performed by accessing locally stored advertisements, as illustrated in steps 2.7/.8 of FIG. 4.

If the client device 103 satisfies the geo-filtering constraints, and/or any other imposed constraints, such as the content still being valid for viewing, then viewing may begin. As shown in steps 2.4*a-c*, in one embodiment, the content may be accessed over a network. However, in another embodiment, the content may also be accessed from a local storage medium associated with client device 103. Decryption of the content may be, in one embodiment, performed in real-time. As advertising markers are read, again, fast forwarding, and other skipping mechanisms are disabled and the advertisement stream is spliced into the content. As before, the choice of the advertisement stream may be based on targeting heuristics from the consumer profile and/or other advertisement metadata. When the inserted advertisement(s) complete playing, the disabled features are enabled, and the content is allowed to play from its exit point. Upon network reconnection, statistics may then be forwarded for reporting and use in updating of advertisement and/or metadata (see steps 2.9-210).

Figure 5:
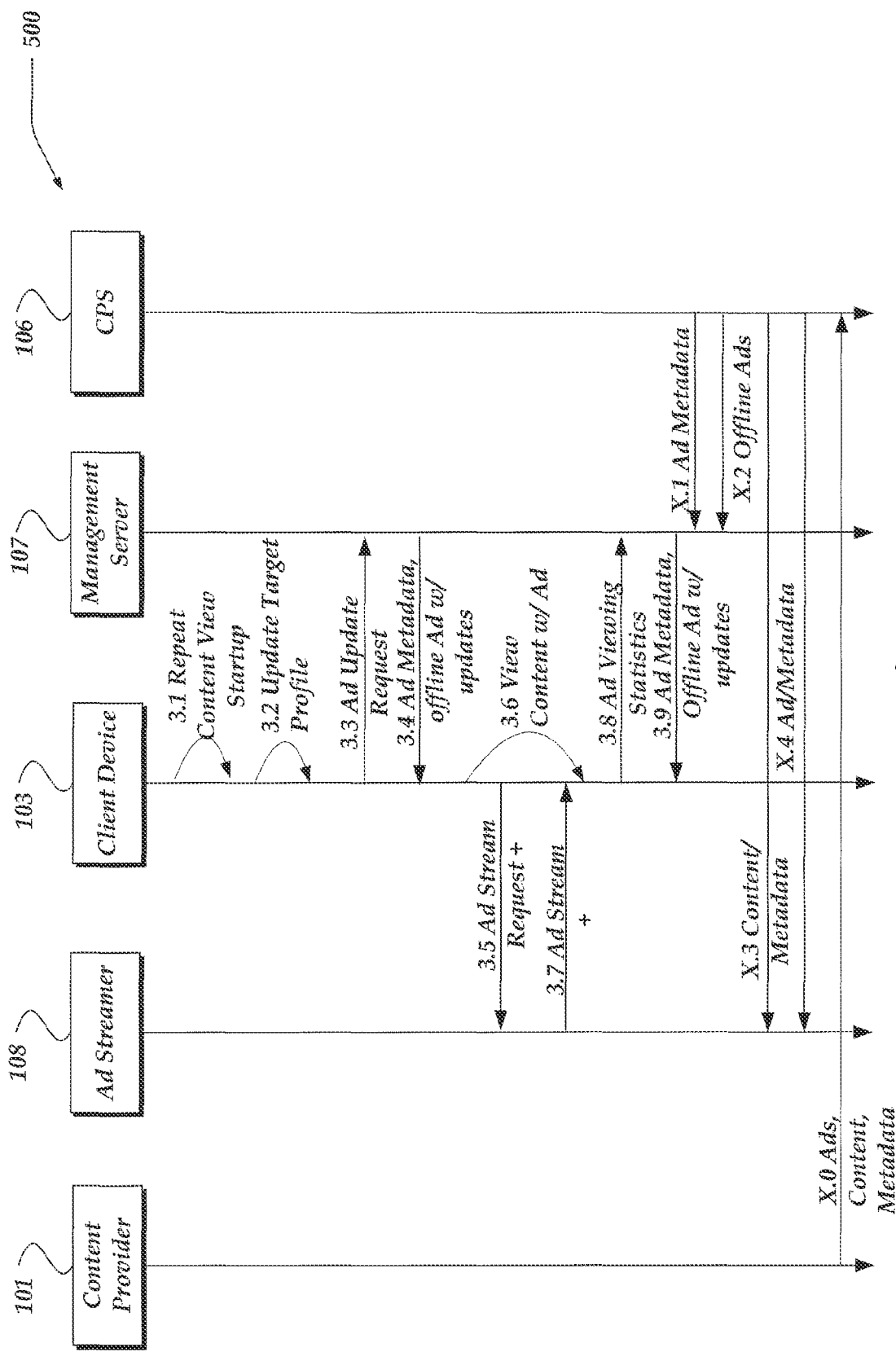
FIG. 5 shows a signal flow diagram generally showing one embodiment of a process for viewing content and refreshable advertisements in an online repeat viewing configuration for the client device.

FIG. 5 show a signal flow diagram generally showing one embodiment of a process for viewing content and refreshable advertisements in an online repeat viewing configuration for the client device. Diagram 500 of FIG. 5 is substantially similar to diagram 300 of FIG. 3, except that in that registration steps and content acquisition steps are not performed. If the client device 103 meets the geo-filtering constraints, including, in one embodiment, that the content is still valid for viewing, the content play may begin as shown in steps 3.1-3.7. Also shown in steps 3.2-3.4, an update in the consumer's target profile may occur, as well as sending of advertisement update requests and receiving advertisement metadata updates based, in part, on the profile updates may occur.

Figure 6:
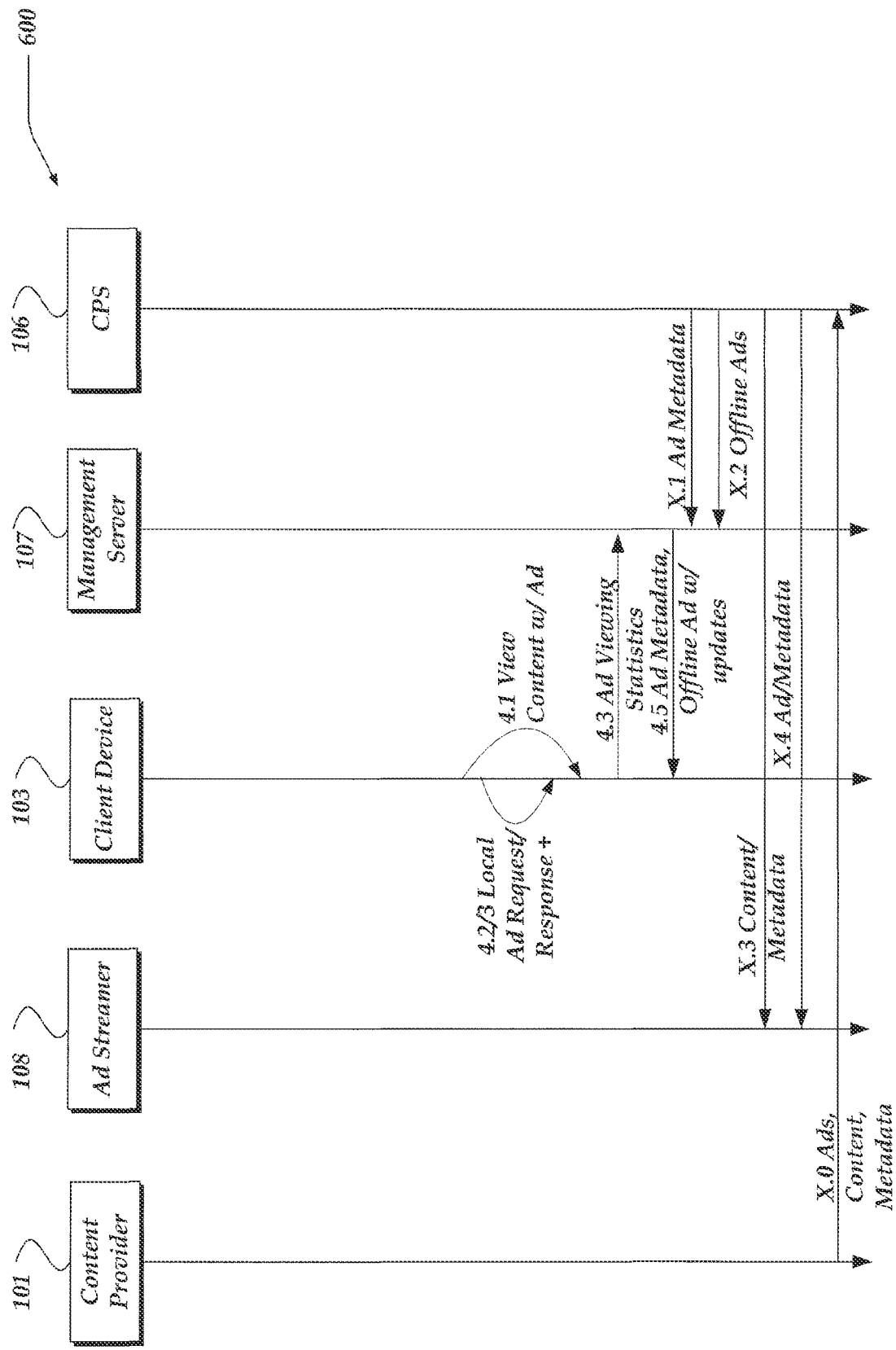
FIG. 6 shows a signal flow diagram generally showing one embodiment of a process for viewing content and refreshable advertisements in an offline repeat viewing configuration for the client device.

FIG. 6 show a signal flow diagram generally showing one embodiment of a process for viewing content and refreshable advertisements in an offline repeat viewing configuration for the client device. Diagram 600 of FIG. 6 is substantially similar to diagram 500 of FIG. 5, except that the replay of content and/or advertisements is performed using locally stored content/advertisements, as seen in steps 4.1-4.3. Thus, several steps of diagram 500 may be avoided. As before, f the client device 103 meets the geo-filtering constraints, including, in one embodiment, that the content is still valid for viewing, the content play may begin. As advertising markers are encountered, the skipping and other viewing avoidance features are disabled, and an advertisement stream is spliced into the content for viewing. As before, the choice of the advertisement stream may be based on targeting heuristics from the consumer profile and/or other advertisement metadata. When the inserted advertisement(s) complete playing, the disabled features are enabled, and the content is allowed to play from its exit point. Upon network reconnection, statistics may then be forwarded for reporting and use in updating of advertisement and/or metadata It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system, comprising:
 a computing device comprising at least one processor, a network interface, and a local content storage device, the computing device to:
 receive, via the network interface from a content source via a network, a first file comprising a first item of audio content and one or more markers, the one or more markers identifying a temporal location within the first item of audio content for playing an additional item of audio content;
 play a first portion of the first item of audio content;
 detect, in the first portion of the first item of audio content, a first marker of the one or more markers;
 determine, responsive to detection of the first marker, that the computing device is unable to communicate with the content source via the network;
 select, responsive to the determination that the computing device is unable to communicate with the content source via the network, a first additional item of audio content from a plurality of additional items of audio content stored in the local content storage device;
 play, at the first marker, the selected first additional item of audio content;
 play a second portion of the first item of audio content;
 detect, in the second portion of the first item of audio content, a second marker of the one or more markers;
 determine, responsive to the detection of the second marker, that the computing device is unable to communicate with the content source via the network;
 select, responsive to the determination that the computing device is unable to communicate with the content source via the network and the playing of the first additional item of audio content, a second additional item of audio content; and
 play, at the second marker, the selected second additional item of audio content.

2. The system of claim 1, comprising the computing device to:
 play one or more additional portions of the first item of audio content;
 detect, in the one or more additional portions of the first item of audio content, a second marker of the one or more markers;
 determine, responsive to detection of the second marker, that the computing device is unable to communicate with the content source via the network;

select, responsive to the determination that the computing device is unable to communicate with the content source via the network, the first additional item of audio content from the plurality of additional items of audio content stored in the local content storage device;

play, at the second marker, the selected first additional item of audio content.

3. The system of claim 1, comprising the computing device to:

subsequently replay the first portion of the first item of audio content;

detect, in the replay of the first portion of the first item of audio content, the first marker of the one or more markers;

determine, responsive to detection of the first marker in the replay of the first portion of the first item of audio content, that the computing device is unable to communicate with the content source via the network;

select, responsive to the determination that the computing device is unable to communicate with the content source via the network, a second additional item of audio content from the plurality of additional items of audio content stored in the local content storage device, the second additional item of audio content different from the first additional item of audio content; and play, at the first marker, the second additional item of audio content.

4. The system of claim 1, wherein the one or more markers are inserted into the first file by the content source, prior to transmission of the first file to the computing device.

5. The system of claim 1, comprising the computing device to:

receive, via the network interface from the content source, the plurality of additional items of audio content; and store the received plurality of additional items of audio content in the local content storage device.

6. The system of claim 5, wherein the local content storage device comprises a secure content storage portion and a secure offline storage portion different from the secure content storage portion, comprising the computing device to:

store the first file in the secure content storage portion; and store the received plurality of additional items of audio content in the secure offline storage portion.

7. The system of claim 1, comprising the computing device to:

determine a geographic location associated with the computing device; and control playback of the first item of audio content based on the geographic location.

8. The system of claim 1, comprising:

the computing device to inhibit playback of the first item of audio content responsive to failure of a geo-filtering constraint based on a geographic location of the computing device at the first marker.

9. The system of claim 1, comprising:

the computing device to play the first portion of the first item of audio content responsive to satisfaction of a geo-filtering constraint based on a geographic location of the computing device at the first marker.

10. The system of claim 1, comprising:

the computing device to disable, responsive to the computing device configured to skip past or fast forward through the first additional item of audio content, at least one feature of the computing device.

11. The system of claim 1, comprising:

the computing device to select the first additional item of audio content based on metadata including at least one of a content playback history, a temporal constraint indicating when the first additional item of audio content can or cannot be played, and a priority of the first additional item of audio content relative to a priority of another additional item of audio content.

12. A method, comprising:

receiving, by a computing device comprising one or more processors via a network interface from a content source via a network, a first file comprising a first item of audio content and one or more markers, the one or more markers identifying a temporal location within the first item of audio content for playing an additional item of audio content;

playing, by the computing device, a first portion of the first item of audio content;

detecting, by the computing device, in the first portion of the first item of audio content, a first marker of the one or more markers;

determining, by the computing device, responsive to detection of the first marker, that the computing device is unable to communicate with the content source via the network;

selecting, by the computing device, responsive to the determination that the computing device is unable to communicate with the content source via the network, a first additional item of audio content from a plurality of additional items of audio content stored in the local content storage device;

playing, at the first marker, the selected first additional item of audio content;

playing a second portion of the first item of audio content;

detecting, in the second portion of the first item of audio content, a second marker of the one or more markers;

determining, responsive to the detection of the second marker, that the computing device is unable to communicate with the content source via the network;

selecting, responsive to the determination that the computing device is unable to communicate with the content source via the network and the playing of the first additional item of audio content, a second additional item of audio content; and playing, at the second marker, the selected second additional item of audio content.

13. The method of claim 12, comprising:

playing, by the computing device, one or more additional portions of the first item of audio content;

detecting, by the computing device, in the one or more additional portions of the first item of audio content, a second marker of the one or more markers;

determine, responsive to detection of the second marker, that the computing device is unable to communicate with the content source via the network;

selecting, by the computing device, responsive to the determination that the computing device is unable to communicate with the content source via the network, the first additional item of audio content from the plurality of additional items of audio content stored in the local content storage device; and playing, by the computing device at the second marker, the selected first additional item of audio content.

14. The method of claim 12, comprising:

subsequently replaying, by the computing device, the first portion of the first item of audio content;

detecting, by the computing device, in the replay of the first portion of the first item of audio content, the first marker of the one or more markers;

determining, by the computing device, responsive to detection of the first marker in the replay of the first portion of the first item of audio content, that the computing device is unable to communicate with the content source via the network;

selecting, by the computing device, responsive to the determination that the computing device is unable to communicate with the content source via the network, a second additional item of audio content from the plurality of additional items of audio content stored in the local content storage device, the second additional item of audio content different from the first additional item of audio content; and playing, by the computing device at the first marker, the second additional item of audio content.

15. The method of claim 12, wherein the one or more markers are inserted into the first file by the content source, prior to transmission of the first file to the computing device.

16. The method of claim 12, comprising:

receiving, by the computing device via the network interface from the content source, the plurality of additional items of audio content; and storing, by the computing device, the received plurality of additional items of audio content in a local content storage device.

17. The method of claim 12, comprising:

determining, by the computing device, a geographic location associated with the computing device; and controlling, by the computing device, playback of the first item of audio content based on the geographic location.

18. The method of claim 12, comprising:

playing, by the computing device, the first portion of the first item of audio content responsive to satisfaction of a geo-filtering constraint based on a geographic location of the computing device at the first marker.

19. The method of claim 12, comprising:

disabling, by the computing device, responsive to the computing device configured to skip past or fast forward through the first additional item of audio content, at least one feature of the computing device.

20. The method of claim 12, comprising:

selecting, by the computing device, the first additional item of audio content based on metadata including at least one of a content playback history, a temporal constraint indicating when the first additional item of audio content can or cannot be played, and a priority of the first additional item of audio content relative to a priority of another additional item of audio content.

\* \* \* \* \*